No. 751,452. PATENTED FEB. 9, 1904.
L. A. W. BIRD.
ROBE FOR FOLDING CARTS.
APPLICATION FILED DEC. 15, 1902.
NO MODEL.
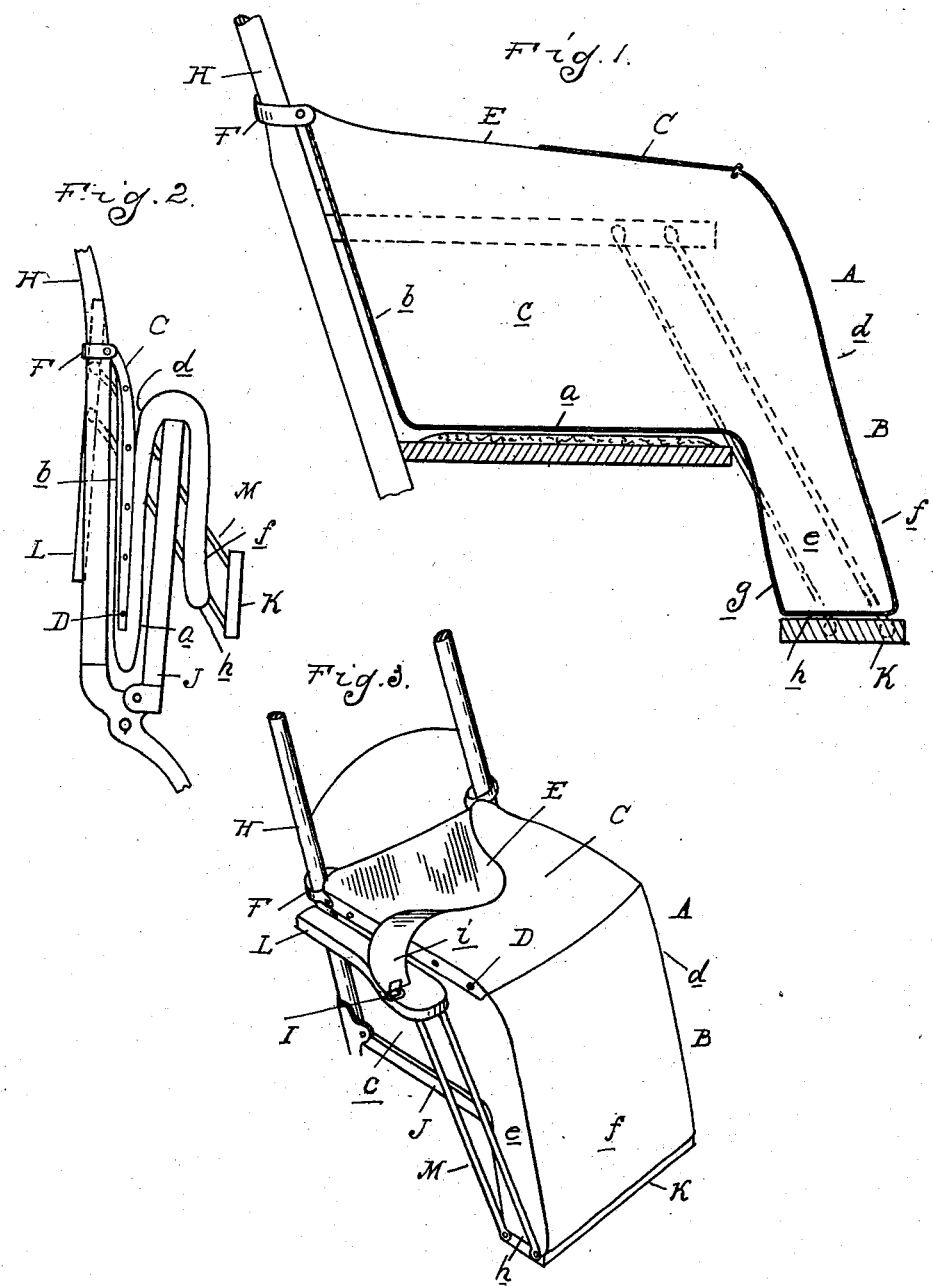

No. 751,452.

Patented February 9, 1904.

UNITED STATES PATENT OFFICE.

LILLIAN A. W. BIRD, OF LONDON, ENGLAND.

ROBE FOR FOLDING CARTS.

SPECIFICATION forming part of Letters Patent No. 751,452, dated February 9, 1904.

Application filed December 15, 1902. Serial No. 135,287. (No model.)

*To all whom it may concern:*

Be it known that I, LILLIAN A. W. BIRD, a subject of the King of Great Britain, residing at Lordship Park, London, England, have invented certain new and useful Improvements in Robes, of which the following is a specification, reference being had therein to the accompanying drawings.

The invention relates to improvements in robes especially designed for use in connection with folding go-carts.

It is the object of the invention to obtain a construction adapted to completely enwrap and protect the occupant of the cart and at the same time to permit of folding the cart without detaching the robe.

It is a further object to provide a construction which will not interfere with quickly placing or removing the child in the cart.

With these objects in view the invention consists in the construction as hereinafter described and claimed.

In the drawings, Figure 1 is a vertical central section through a portion of the go-cart to which my improvement is applied. Fig. 2 is a view showing the cart in folded position with one arm broken away. Fig. 3 is a perspective view.

At the present time the older construction of child's carriage comprising a basket-body mounted upon four wheels has been largely replaced by folding-chair constructions. The latter are much more convenient for ordinary use in mild weather on account of the ease with which they may be carried upon street-cars and the small space which they occupy when folded. They do not, however, take the place of the basket construction for use in colder weather, first, because it is difficult to protect the child as thoroughly from the cold, and, secondly, for the reason that if wraps are used they interfere with the folding of the cart. By the use of my improved construction of robe both of these objections are overcome, and the folding construction of cart is rendered as serviceable for winter use as in mild weather.

My improvement comprises a robe in the form of a bag or sack adapted to completely envelop the body of the child and fashioned to conform with the shape of the folding cart. In detail the robe comprises a body portion A, comprising a seat-section $a$, a back section $b$, side sections $c$, and a front section $d$, united to completely surround the space above the seat and between the arms of the cart. In front of the seat is a downwardly-projecting portion B for receiving the feet of the child and comprising downward extensions of the sides $c$, front $d$, and seat portions $a$, respectively, designated by $e$, $f$, and $g$. At the lower end of these sections is formed the bottom $h$, which is so united with the side sections as to form a closed bag or sack.

The opening formed at the top of the sides, back, and front is especially large to permit of freely inserting the body of the child therein. To then close this opening, a flap C is provided, which at its forward edge is united with the front portion $d$ and is detachably secured by suitable means, such as the buttons D, to the upper edges of the sides $c$. This flap C is cut away at E to form a yoke for surrounding the neck or upper portion of the body of the child.

For securing the robe to the cart straps, such as F, or other suitable securing devices are arranged at the upper end of the corners formed by the juncture of the sides and back of the robe. These straps may be drawn around the handle-bars H of the cart and then secured by buttons or in any other suitable way. The ends $i$ of the yoke formed by the flap C are preferably provided with eyes or loops I, which may be secured to the back of the cart by passing the straps F through the same before buttoning them in position.

With the construction as described it will be understood that when the cart is in position for use section $b$ of the robe will lie adjacent to the back of the cart and section $a$ will cover the seat J and the downwardly-extending portion B will be arranged in front of the seat with its bottom $h$ resting upon the foot-rest K of the cart. The sides $c$ of the robe will also be arranged adjacent to the arm-rests L of the cart, and in the construction of the cart shown these arm-rests are connected with the foot-rest K by links M, which are also pivotally secured to the seat. It will be understood that with the construction of cart just described when the seat is folded in adjacent to the back the foot-rest K will also be carried up and folded into parallelism with said seat and back. When the cart is thus folded, the robe will also fold, the body portion A being folded between the seat and back and the downward extension B folding outside of the seat and between the latter and the foot-rest. The straps F will prevent detachment of the robe from the cart, and whenever the seat is turned down for use the robe will also expand into a shape ready for use.

What I claim as my invention is—

1. In combination with a folding cart provided with seat, back and foot-rest portions, a robe secured to the back of the cart and extending therefrom over the seat to the foot-rest, the back and seat portion of said robe being folded between the back and seat of the cart and the lower portion of said robe being folded between the foot-rest and seat of said cart when the cart is folded.

2. In combination with a folding cart provided with back, seat and foot-rest portions, a robe comprising an open-ended sack conforming in shape to the shape of the back, seat and foot-rest portions of the cart, and means to secure the upper open end of said robe to the cart.

3. In combination with a folding cart provided with back, seat and foot-rest portions, a robe comprising an open-ended sack conforming in shape to the shape of the back, seat and foot-rest portions of the cart, and straps for securing the open upper end of said robe to the cart.

4. A robe for folding carts, comprising a bag or sack consisting of the portions $b$, $a$ and $g$ united to the side portions $c$, the latter being fashioned in conformity to the back, seat and foot-rest of the cart, the front portion $f$ and bottom portion $h$ completing the sack, a flap permanently secured at its lower end to the upper end of the front portion $f$ and detachably secured along its sides to the upper edges of said side portions, the upper end of said flaps being yoke-shaped to conform to the body of the occupant, loops secured to the free corners of said flap, and straps secured to the upper corners of the sack arranged to engage the loops on the flap and to be secured to the back of the cart.

5. In combination with a folding cart, a robe secured thereto and adapted to fold therewith when the cart is folded, said robe consisting of the seat portions $b$, $a$ and $g$ united to the side portions C, the latter being fashioned in conformity to the back, seat and foot-rest of the cart, the front portion $f$ and bottom portion $h$ completing the sack, and a flap united to said front and detachably secured to said side portions.

In testimony whereof I affix my signature in the presence of two witnesses.

LILLIAN A. W. BIRD.

Witnesses:
M. B. O'DOGHERTY,
A. G. ROBERTSON.